Dec. 6, 1960

L. KOSTEN ET AL 2,963,220

INFORMATION BEARER FOR RECORDING
FIGURES IN A STYLED FORM
Filed June 2, 1955

INVENTORS
L. KOSTEN, A.J. VAN DER TOORN, AND R.M.M. OBERMAN
BY
Hugh A. Kirk
ATT'Y.

United States Patent Office 2,963,220

Patented Dec. 6, 1960

2,963,220

INFORMATION BEARER FOR RECORDING FIGURES IN A STYLED FORM

Leendert Kosten and Adrianus Johannes van der Toorn, The Hague, and Roelof Maarten Marie Oberman, Voorburg, Netherlands, assignors to de Staat der Nederlanden, ten Deze Vertegenwoordigd Door de Directeur-Generaal der Posterijen, Telegrafie en Telefonie, The Hague, Netherlands Filed June 2, 1955, Ser. No. 512,810

Claims priority, application Netherlands June 12, 1954

5 Claims. (Cl. 235—61.12)

Figure 1:
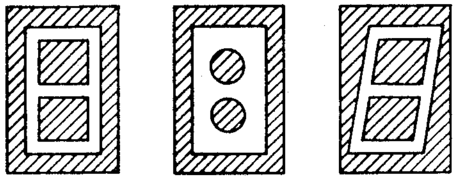

The invention relates to an information bearer for recording figures in a styled form. More particularly, it deals with an information bearer for automatic bookkeeping and similar systems, in which use is made of written numerical data and in which systems these data are scanned photo-electrically or in some other automatic way for identification.

Automatic bookkeeping systems are well known and many of them are e.g. punched card systems with "mark-scanning" and "mark-sensing," in which on a card, a column having 10 numbered squares is reserved for each figure to be written and in which a figure is represented by placing a dash, a crosslet or some other mark in the square associated with the relevant figure.

However the filling-in of these cards in the above systems has two drawbacks:

(1) It always requires a certain amount of skill;

(2) A number thus filled-in in several columns by means of the said marks is not conspicuous as a whole, which makes a visual check of the correctness of filling-in more difficult, and as a result, the filling-in of the cards and forms can not be left to unskilled people.

Other machines are known, which are capable of scanning and identifying printed figures letters directly by their shape (see Dutch Patent 68,580 and 68,903 and U.S. Patent 2,209,106).

In contradistinction to hand-written figures, printed characters show a smaller variation in shape. If it were required that the identifying machine should be capable of reading hand-written figures, this should not a priori be regarded as impossible, but this would probably require a computing machine (computing taken in the wide sense of analysis and synthesis of information) having such a large and readily accessible memory, that it would not be economically feasible.

It is an object of this invention to provide an efficient, simple, effective, and economic information bearing means for a bookkeeping system, which means reduces the variation in the shape of written figures thereon so that they can not only be read by an untrained operator but also scanned by a machine.

Generally speaking, this invention comprises an information bearer, such as a card or sheet, with means thereon to guide and insure that a writer placing figures on the bearer, will only write them over definitely styled paths, so that all of such written figures occur in predetermined places and in predetermined portions of a standardized pattern, which pattern herein is styled in the form of a figure 8. Thus, by writing over different portions of said stylized figure 8-shaped pattern, all the different numbers from 1 through 9 and 0 can be written, both so they can be read by an untrained operator as well as scanned by a machine. This machine may optically scan each figure pattern according to a predetermined continuous scanning path divided into phases which at regularly timed intervals, successively cut or scan at least once the center of each of the seven separate equal length vertical and horizontal parts that make up the stylized 8-shaped pattern of the information bearer of this invention. Thus, this information can be transformed into different trains of electrical impulses for controlling a bookkeeping or similar machine.

Figure 2:
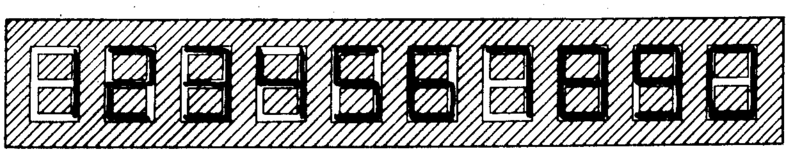
Figure 3:
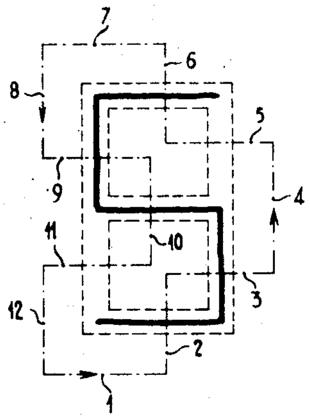

The above mentioned and other features and objects of this invention and the manner of attaining them will become more apparent and the invention itself will be best understood by reference to the following description of embodiments of the invention taken in conjunction with the accompanying drawings, wherein:

Fig. 1 shows three different possible embodiments of a parallelogram space containing stylized figure 8-shaped writing tracks or guides which may be used on an information bearing sheet or card;

Fig. 2 shows a set of the printed rectangles according to the first embodied track or guide showing Fig. 1, filled-in or written-in with the numerals "1" through "9" and "0" to show how they can be visually read by an untained operator; and Fig. 3 shows an enlarged figure "5" written on a dotted guide according to Fig. 2, with schematically in dot-dash lines thereover, the scanning path which successively crosses each of the seven parts of the guide or written track, which path contains twelve scanning phases to show how the tracks or guides may be scanned by a machine.

According to the invention, the information bearer, such as a card, sheet, form, or the like, is given such properties that a slight compulsion is exercised upon the writer to write the figures in definite highly styled forms at clearly defined places. In this way, the variations in shape and place of the written figures are so greatly reduced that a comparatively simple scanning system can be used, and also the styled figures warrant to the writer or the operator a sufficient redundancy in the picture to enable him also to check visually the written numbers.

According to one embodiment of the invention, a first possibility of obtaining compulsory styling comprises an information bearer provided with printed squares or rectangles in places where the contingent figures are to be written. Each of these squares contains a printed pattern having the shape of a more or less rectangular or parallelogram-shaped styled figure 8 (see Fig. 1).

In the case of photoelectric scanning, the colour of the printing ink should be so chosen with respect to the colour of the background, to the wavelength of the light used, and to the responsiveness of the photocell, that blank parts cause a negligible spurious signal.

The filling-in of these squares is preferably done by following printed examples, the directive being given that, when filling in said squares, the writer should follow as accurately as possible the tracks constituting the 8-shaped pattern or guide marked in print. Fig. 2 shows an example of a set of figures thus filled in.

According to this embodiment of the invention, it is also very important to make said patterns larger than is required for normal handwriting. The writer is thus compelled to draw the figures rather than just write them fluently, thereby achieving smaller variations in the aspect of the writing.

A further possibility of exercising a compulsion or guide towards the desired styling comprises, according to another embodiment of the invention, having such different surface properties on the information bearer between the inside and outside of the writing track destined for the styled figures, that writing inside these tracks is easy, while writing outside them is difficult or impossible.

If e.g. writing is to be done with an aqueous ink, those parts of the squares forming the complement of or space between or guides for the writing tracks may be printed with an ink containing lacquer or varnish. This makes writing in the squares inside the tracks practically impossible. In this case the writing tracks themselves may be printed with a hygroscopic printing ink, which ensures wide lines in the writing tracks and, consequently, a reliable and visual figure for scanning.

If a pencil is to be used for writing, the writing tracks may be indicated by means of a coarse-pained printing ink as rough parts on a very smooth kind of paper. In this case the pencil-writing can easily be applied in the writing-tracks only.

Finally, also according to still another embodiment of the invention the writing-tracks may be formed in relief. This may be done afterwards not only by wet pressing or by dry stamping of a paper bearer, but also by applying a press-mark during the manufacture of the paper in a similar way in which watermarks are obtained.

While there is described above the principles of this invention in connection with specific apparatus, it is to be clearly understood that this description is made only by way of example and not as a limitation to the scope of this invention.

While we have illustrated and described what we regard to be the preferred embodiment of our invention, nevertheless it will be understood that such is merely exemplary and that numerous modifications and rearrangements may be made therein without departing from the essence of the invention.

We claim:

1. An information bearer sheet comprising spaces which contain therein figure 8-shaped writing tracks, each consisting of seven parts connecting at their ends to form continuous stylized 8-shaped pattern, and coating means in said spaces to facilitate marks to adhere to the surface of said sheet in said tracks when said patterns are being filled-in and to prevent marks from adhering to the surface of said sheet outside said tracks, whereby writing of different figures can be read either visually or mechanically only on all or part of said seven parts of said patterns in said spaces.

2. A sheet according to claim 1 wherein said spaces are rectangularly shaped, and said parts are horizontal and vertical parts.

3. A sheet according to claim 1 wherein said coating fills said spaces except for said 8-shaped patterns therein.

4. A sheet according to claim 3 wherein said coating is composed of a hydrophobic material and the writing tracks in said spaces are provided with a hydroscopic printing ink.

5. A sheet according to claim 1 wherein 8-shaped patterns in said spaces comprise relief markings.

References Cited in the file of this patent

UNITED STATES PATENTS

| | | |
|---|---|---|
| 1,117,184 | Goldberg | Nov. 17, 1914 |
| 1,165,663 | Goldberg | Dec. 28, 1915 |
| 1,887,160 | Lorber | Nov. 8, 1932 |
| 2,211,320 | Efron | Aug. 13, 1940 |
| 2,240,545 | Bryce | May 6, 1941 |
| 2,261,542 | Dickinson et al. | Nov. 4, 1941 |
| 2,288,073 | Davis et al. | June 30, 1942 |
| 2,294,679 | Maul | Sept. 1, 1942 |
| 2,308,928 | Maul | Jan. 19, 1943 |
| 2,508,953 | Knutsen | May 23, 1950 |
| 2,557,022 | Wolowitz | June 12, 1951 |

FOREIGN PATENTS

| | | |
|---|---|---|
| 686,289 | Great Britain | Jan. 21, 1953 |